United States Patent
Paeschke et al.

(10) Patent No.: US 6,841,092 B2
(45) Date of Patent: Jan. 11, 2005

(54) ANTI-STOKES FLUORESCENT COMPOSITIONS AND METHODS OF USE

(75) Inventors: Manfred Paeschke, Basdorf (DE); Benedikt Ahlers, Berlin (DE); Anett Bailleu, Berlin (DE); Oliver Muth, Berlin (DE); Arnim Franz-Burgholtz, Falkensee (DE); Wolfgang Schmidt, Berlin (DE); Detlef Starick, Bad Liebenstein (DE); Wolfgang Kempfert, Bad Liebenstein (DE)

(73) Assignees: Bundesdruckerei GmbH, Berlin (DE); Fa. Leuchtstoffwerk Breitungen GmbH, Breitungen (DE)

( * ) Notice: Subject to any disclaimer, the term of this patent is extended or adjusted under 35 U.S.C. 154(b) by 0 days.

(21) Appl. No.: 10/101,524

(22) Filed: Mar. 18, 2002

(65) Prior Publication Data

US 2002/0130304 A1 Sep. 19, 2002

(30) Foreign Application Priority Data

Mar. 16, 2001 (DE) ......................................... 101 13 267

(51) Int. Cl.⁷ ...................... C09K 11/08; B42D 221/00; B42D 223/00
(52) U.S. Cl. ....................... 252/301.4 R; 359/2; 283/92
(58) Field of Search ........................ 252/518.1, 521.1, 252/301.4 R, 301.4 H; 359/2; 283/92

(56) References Cited

U.S. PATENT DOCUMENTS

| | | |
|---|---|---|
| 4,047,033 A | 9/1977 | Malmberg et al. |
| 6,081,069 A | 6/2000 | Matsuda et al. |
| 6,132,642 A | 10/2000 | Kane |

FOREIGN PATENT DOCUMENTS

| | | |
|---|---|---|
| DE | 2547768 | 7/1976 |
| DE | 4117911 | 12/1991 |
| EP | 139192 | * 5/1985 |
| EP | 299409 | * 3/1989 |
| GB | 2245985 | 1/1992 |
| GB | 2258659 | 2/1993 |
| GB | 2258660 | 2/1993 |
| SE | 7413480 | 4/1976 |
| SE | 7705938-4 | 11/1980 |
| WO | WO 00/60527 | 10/2000 |

OTHER PUBLICATIONS

Pawar et al "Luminescence of (yttrium, gadolinium and lanthanum)oxysulfide ((Y, Gd and La)2O2S) phosphors", Indian Journal of Pure and Aplied Physics (1976), 14(2), 960–3 (Abstract Only).*

Blasse et al "The gadolinium (3+) luminescence of the solid solutions yttrium gadolinium oxide sulfide. . . ", Chemical Physics Letters (1989), 164(6), 617–20 (Abstract Only).*

Kurochkin et al "Anti–Stokes luminescence of erbium, ytterbium–doped lanthanum oxysulfides. . . ", Optika i Spektroskopiya (1992), 73(4), 741–8 (Abstract Only).*

* cited by examiner

*Primary Examiner*—Mark Kopec
(74) *Attorney, Agent, or Firm*—Darby & Darby

(57) ABSTRACT

The present invention provides a secured document including a composition capable of anti-Stokes fluorescence containing an ion capable of absorption of electromagnetic radiation, an ion capable of emitting electromagnetic radiation, and a matrix composition comprising gadolinium, yttrium, lanthanum, and lutetium, wherein the wavelength of the emitted electromagnetic radiation is shorter than the wavelength of the absorbed electromagnetic radiation, and wherein the concentrations of the absorbing and emitting ions are adjusted to achieve concentration quenching of anti-Stokes luminescence.

20 Claims, No Drawings

US 6,841,092 B2

ANTI-STOKES FLUORESCENT COMPOSITIONS AND METHODS OF USE

CROSS-REFERENCE TO RELATED APPLICATIONS

Reference is made to German patent application numbers 101 13 267.0 and 101 13 268.9, which were filed on Mar. 16, 2001. Reference is also made to U.S. patent application Ser. No. 10/101,520 filed Mar. 15, 2002 (now U.S. Pat. No. 6,686,074) and U.S. patent application Ser. No. 10/099,042 filed Mar. 15, 2002. These applications are incorporated herein by reference.

FIELD OF THE INVENTION

The present invention provides a composition capable of anti-Stokes fluorescence that includes (a) an ion capable of absorbing electromagnetic radiation, and (b) an ion capable of emitting electromagnetic radiation, wherein the wavelength of the emitted electromagnetic radiation is shorter than the wavelength of the absorbed electromagnetic radiation, and the concentrations of components (a) and (b) are adjusted to achieve concentration quenching. Such compositions are incorporated in authentication elements that are placed on secured documents.

BACKGROUND OF THE INVENTION

When a phosphor or other luminescent material emits light, in general, it emits light according to Stokes' Law, which provides that the wavelength of the fluorescent or emitted light is always greater than the wavelength of the exciting radiation. While Stokes' Law holds for the majority of cases, it does not hold in certain instances. For example, in some cases, the wavelength is the same for both the absorbed and the emitted radiation. That is, the efficiency appears to be perfect or unity. This is known as resonance radiation.

In other cases, Stokes' Law does not hold where the energy emitted is greater than the energy absorbed. This is known as anti-Stokes emission. This may be due, at least in part, to the fact that at the time a photon is absorbed by a molecule, a collision with one or more other molecules adds extra energy to the absorbing molecule. Consequently, the absorbing molecule receives excess energy over and above what it received from absorbing the photon, and it is promoted to a higher excited state than it would have been promoted to from the original absorption event alone. The molecule is then free to decay from this super-excited state and emit a more energetic photon than it originally absorbed. Anti-Stokes materials typically absorb infrared radiation in the range of about 700 to about 1300 nm, and emit in the visible spectrum.

The use of anti-Stokes luminophores was first mentioned in 1974 by Malmberg et al., in Swedish patent application nos. 7705938-4 and 7413480-0, which correspond to German Patent No. 2,547,768. Further, Bratchley et al., British Patent Nos. 2,258,659 and 2,258,660, proposed oxysulfide anti-Stokes luminophores are materials that could be used to code security documents. However, Malmberg and Bratchley only suggest using $Y_2O_2S$ as a basic lattice material.

Muller et al., WO 00/60527, proposed anti-Stokes luminophore oxysulfide compositions that are stimulated with a pulsed 980 nm laser in order to increase the reliability of detection. Muller also suggested that the excitation conditions should be such that Class I lasers (which have an output power less than 1 mW and are therefore, not harmful to the human eye) can be used. This can be achieved by accurately matching the pulse frequency and the pulse interval to the build-up characteristics of the luminophore used. The laser parameters are adjusted so that the resulting luminescence intensities are at least 50%–90% of the saturation intensity, i.e., the intensity at the steady state laser excitation, of the respective fluorescent substance. Muller suggests $Y_2O_2S$:Yb, Er, $Y_2O_2S$:Yb, Tm and $Gd_2O_2S$:Yb, Er are suitable luminophores.

There are innumerable different types of documents and things which are subject to counterfeiting or forgery, and many different techniques and devices have been developed for determining the authenticity of a document or a thing. By way of example only, documents which are particularly in need of authentication include bank notes, identification papers, passports, packagings, labels and stickers, driver's licenses, admission tickets and other tickets, tax stamps, pawn stamps, and stock certificates. As used herein, the term "secured document" includes any document or thing which is provided with a distinguishing device (whether printed or not) which can be used to authenticate, identify or classify the document.

Furthermore, in addition to determining the authenticity of a secured document, it is sometimes useful to also determine the nominal value of the document or the nature of the document. For example, in a postal system, it is not only necessary to establish the authenticity of the postal stamps and/or release stamps, it may also be beneficial to determine the value of the postage stamps as they are passed through a postal sorting machine.

Accordingly, as used herein, the term "authentication element" is intended to refer to any "device" which may be printed on, or otherwise attached to, a secured document for the purpose of authenticating the document or for the purpose of determining its value and/or type or any other characteristic. Likewise "authenticity" is meant to encompass value, type or other characteristic of a secured document, as well as the genuineness of a document or thing.

It is known to provide secured documents such as bank notes with an authentication element in the form of a distinctive luminescent ink which, when excited by a light of a predetermined wavelength, will emit a distinctive low intensity radiation that can be detected and analyzed as a means for authenticating a secured document. German Patent No. DE 411 7911 A1 discloses such a system which includes a conically expanding fiber optical waveguide and an optical processing system. The radiation from the object to be tested can be collected over a large spatial angle with the narrow cross-sectional end of the fiber optical waveguide. Because of the cross sectional transformation, the radiation emerges from the fiber at a significantly smaller angle, which is coordinated with the cone angle of the optical processing system.

With such a system it is possible to detect relatively low intensity distinguishing luminescent authenticity elements. However, the magnitude of the distinguishing luminescent elements must exceed a certain threshold. The system is therefore still relatively insensitive. Because of the use of a conical fiber, there is also the disadvantage that only a small region of the document can be monitored and checked. Moreover, the system may fail if the authenticity element is disposed at certain places in the document. Further, documents such as postage stamps cannot be identified with this arrangement at the high speeds customary in sorting, distributing and/or counting machines. In the case of laser excitation, characteristic pulse responses, which are of decisive importance for identifying authenticity, also may not be recognized and evaluated.

SUMMARY OF THE INVENTION

The present invention provides a composition capable of anti-Stokes fluorescence including:

(a) an ion capable of absorbing electromagnetic radiation, (b) an ion capable of emitting electromagnetic radiation, and (c) a matrix composition comprising gadolinium, yttrium, lanthanum, and lutetium, wherein the wavelength of the emitted electromagnetic radiation is shorter than the wavelength of the absorbed electromagnetic radiation, and the concentrations of components (a) and (b) are adjusted to achieve concentration quenching of the anti-Stokes luminescence.

The present invention also provides compositions, such as those described above, wherein the increase (or build-up) and decrease (or decay times) are adjusted by increasing and/or decreasing the concentrations of components (a) and (b) in order to increase the read-out speed of a secured document identified with an authentication element comprising such a composition.

In a preferred embodiment, the present invention provides a composition that includes a gadolinium oxysulfide selected from the group consisting of (a) a composition of the formula $(Gd_{(1-x-y)}Yb_xTm_x)_2O_2S$; and (b) a composition of the formula $(Gd_{(1-x-y)})_2O_2S:Yb_xTm_y$, wherein x and y are numbers greater than 0, Yb is the ion capable of absorption and Tm is the ion capable of emission. Preferably, the present invention provides a composition having the formula $(Gd_{(1-x-y)})_2O_2S:Yb_xTm_y$, wherein x is $0.05 \leq x \leq 0.80$ and y is $0.0001 \leq y \leq 0.10$, and more preferably x is $0.20 \leq x \leq 0.60$ and y is $0.0001 \leq y \leq 0.05$, and the composition provides a read-out speed of up to 10 m/s, and preferably, between about 3 and about 6 m/s.

DETAILED DESCRIPTION OF THE INVENTION

The composition of the present invention consists of anti-Stokes fluorescent materials which are thulium-activated and ytterbium co-doped gadolinium oxysulfides having a formula selected from $(Gd_{(1-x-y)}Yb_xTm_x)_2 O_2S$ or $(Gd_{(1-x-y)})_2O_2S:Yb_x Tm_y$, wherein x and y are numbers greater than 0, Yb is the ion capable of absorption and Tm is the ion capable of emission.

In a preferred embodiment, the composition of the present invention has the formula $(Gd_{(1-x-y)})_2O_2S:Yb_xTm_y$, wherein x is $0.05 \leq x \leq 0.80$ and y is $0.0001 \leq y \leq 0.10$, and more preferably x is $0.20 \leq x \leq 0.60$ and y is $0.0001 \leq y \leq 0.05$, and the composition provides a read-out speed of between about 3 and about 6 m/s.

Alternatively, the composition may employ yttrium, lanthanum, and/or lutetium as components of the basic lattice or matrix. In such alternative compositions, ytterbium functions as an absorber of infrared excitation radiation and Tm as an emitter of the visible or invisible luminescence radiation.

Further, the present invention provides a composition such as that described above, wherein concentration quenching of the anti-Stokes luminescence is achieved, i.e., a portion of the emitted radiation is quenched by the Yb and Tm ions and the amount that is quenched is determined by the concentration of these ions in the composition. As a result, a short decay time of the emission radiation is achieved.

The compositions of the present invention are capable of converting comparatively low-energy infrared (IR) excitation radiation into high-energy radiation (anti-Stokes luminescence). The radiation emitted can be in the visible as well as in the invisible range.

The relative intensity of the radiation emitted by the compositions of the invention may be adjusted by adjusting the relative concentration of absorbing and emitting ions in the composition. For example, one may adjust the composition by increasing or decreasing the concentration of ytterbium and/or thulium in order to enhance the intensity of the radiation emitted from the composition.

The increase (or "build-up") and decrease (or "decay") characteristics, i.e., the increase time or rate and decrease time or rate of the emitted electromagnetic radiation, of anti-Stokes fluorescent materials largely determine the reliability of detection and the possible read-out speed of a luminescing material. For example, if the increase and decrease times are too long, the detector will not get a signal above a certain threshold value in a short time and rapid detection is not possible. The increase characteristics of the compositions can be characterized, for example, by the time required to reach 90 percent of the saturation intensity, or by the so-called, build-up constant (which is defined as the time required to reach $1/e^{th}$ of the steady state luminescence intensity). The intensity profile of the emitted radiation is determined in a specified wavelength range over a predetermined measuring time interval after excitation. The intensity profile is then analyzed in a number of different ways to determine the authenticity of the secured document. In this regard, reference is made to U.S. patent application Ser. No. 10/099,042 filed Mar. 15, 2002, the text of which is incorporated herein by reference in its entirety.

Without wishing to be bound by any particular theory, it has been found that, in comparison to photoluminophores or cathodoluminophores, anti-Stokes fluorescent substances, in general, have a relatively slow build-up, which may extend up to a few hundred microseconds. Such a delayed surge in luminescence hinders their use in detection systems because this limits the reliability of detection and the read-out speed. However, one may compensate for this slow build-up and decay by adjusting the excitation mode and luminescence kinetics with the time functions of the detection system and of the evaluating electronics. This is possible using the compositions and methods of the present invention.

The relationships between the saturation intensity and the increase and decrease times can be varied within a wide range. Thus, it is possible to ensure that the composition exhibits low increase times and/or decrease times, which are required for realizing high-speed detection. For this purpose, the concentrations of the absorber and/or of the emitter of the electromagnetic radiation are adjusted so that the interactions between these ions leads to a proportionate quenching of the anti-Stokes luminescence (concentration quenching). For example, the concentrations of Yb and Tm for high read-out speeds are selected within the following limits:

$(Gd_{(1-x-y)})_2O_2S:Yb_xTm_y$ wherein $0.05 \leq x \leq 0.80$ and $0.0001 \leq y \leq 0.10$.

In a preferred embodiment, in order to achieve read-out speeds of up to 10 m/s, and preferably, between 3 and 6 m/s, x and y are chosen according to the following parameters: $0.20 \leq x \leq 0.60$ and $0.0001 \leq y \leq 0.05$. Because it has been found that the ratio of the intensities of the emission lines of the emission spectrum and of the build-up and decay behavior are affected by the concentration of the absorber and/or emitter, the composition and therefore, the secured document can be identified with even greater certainty using a combined detection system, wherein these mutually dependent properties are adjusted. In a preferred embodiment, the anti-Stokes luminophore is detected by a pulsed laser.

The selective incorporation of other cations and/or anions in the lattice or matrix of the compositions of the invention provides additional methods for influencing the increase and decrease characteristics of the composition. Additional cations and/or anions in the lattice will decrease the steady-state anti-Stokes luminescence insignificantly, whereas the increase and decrease times are clearly reduced.

In addition, selectively influencing the increase and decrease behavior and the relationship of the intensities of the emission lines by the concentration of the absorber and/or of the emitter and by incorporating additional anions and/or cations in the lattice of the fluorescent material, as indicated above for the case of the $(Gd_{(1-x-y)})_2O_2S:Yb_xTm_y$, can also be carried out for other anti-Stokes fluorescent substances.

In a preferred embodiment, the compositions of the invention are incorporated into authentication elements that are applied to the surface of the secured document.

The present invention is not to be limited in scope by the specific embodiments described herein. Indeed, various modifications of the invention in addition to those described herein will become apparent to those skilled in the art from the foregoing description and any accompanying figures. Such modifications are intended to fall within the scope of the appended claims.

Patents, patent applications, publications, procedures, and the like are cited throughout this application, the disclosures of which are incorporated herein by reference in their entireties.

What is claimed is:

1. A composition capable of anti-Stokes fluorescence, wherein the wavelength of the emitted electromagnetic radiation is shorter than the wavelength of the absorbed electromagnetic radiation, comprising:
    (a) an ytterbium ion capable of absorbing the electromagnetic radiation;
    (b) an ion capable of emitting the electromagnetic radiation; and
    (c) a matrix composition comprising an oxysulfide of the formula $(R_{1-x-y})_2O_2S:Yb_xA_y$;
    wherein the concentrations of ytterbium ions and ions capable of emitting the electromagnetic radiation are adjusted to achieve concentration quenching of anti-Stokes luminescence;
    wherein R is selected from gadolinium, yttrium, lanthanum, and lutetium;
    wherein $0.20 \leq x \leq 0.60$ and $0.0001 \leq y \leq 0.05$; and
    wherein A is the ion capable of emitting the electromagnetic radiation.

2. The composition of claim 1, wherein R is gadolinium.

3. An authentication element for application to the surface of a secured document comprising the composition of claim 1.

4. A method of authenticating a secured document comprising radiating an authentication element of claim 3.

5. A composition capable of anti-Stokes fluorescence comprising
    (a) an ion capable of absorption of electromagnetic radiation,
    (b) an ion capable of emitting electromagnetic radiation, and
    (c) a matrix composition comprising a gadolinium oxysulfide of the formula $(Gd_{(1-x-y)})_2O_2S:Yb_xTm_y$,
    wherein x and y are numbers greater than 0, Yb is the ion capable of absorption and Tm is the ion capable of emission;
    wherein the wavelength of the emitted electromagnetic radiation is shorter than the wavelength of the absorbed electromagnetic radiation; and
    wherein the concentrations of (a) and (b) achieve concentration quenching of anti-Stokes luminescence.

6. The composition of claim 5, wherein x is $0.05 \leq x \leq 0.80$ and y is $0.0001 \leq y \leq 0.10$.

7. The composition of claim 6, wherein x is $0.20 \leq x \leq 0.60$ and y is $0.0001 \leq y \leq 0.05$, and the composition provides a read-out speed of between about 3 and about 6 m/s.

8. An authentication element for application to the surface of a secured document comprising the composition of claim 7.

9. A method of authenticating a secured document comprising radiating an authentication element of claim 8.

10. The composition of claim 6, wherein the composition provides a read-out speed of up to 10 m/s.

11. An authentication element for application to the surface of a secured document comprising the composition of claim 10.

12. A method of authenticating a secured document comprising radiating an authentication element of claim 11.

13. An authentication element for application to the surface of a secured document comprising the composition of claim 5.

14. A method of authenticating a secured document comprising radiating an authentication element of claim 13.

15. A composition capable of anti-Stokes fluorescence, wherein the wavelength of the emitted electromagnetic radiation is shorter than the wavelength of the absorbed electromagnetic radiation, comprising:
    (a) an ytterbium ion capable of absorbing the electromagnetic radiation;
    (b) a thulium ion capable of emitting the electromagnetic radiation; and
    (c) a matrix composition comprising an oxysulfide compound of the formula $(R_{1-x-y})_2O_2S:Yb_xTm_y$;
    wherein the concentrations of ytterbium ions and thulium ions are adjusted to achieve concentration quenching of anti-Stokes luminescence;
    wherein R is selected from gadolinium, yttrium, lanthanum, lutetium, and combinations thereof; and
    wherein $0.20 \leq x \leq 0.60$ and $0.0001 \leq y \leq 0.05$.

16. The composition of claim 15, wherein R is gadolinium.

17. An authentication element for application to the surface of a secured document comprising the composition of claim 16.

18. A method of authenticating a secured document comprising radiating an authentication element of claim 17.

19. An authentication element for application to the surface of a secured document comprising the composition of claim 15.

20. A method of authentication a secured document comprising radiating an authentication element of claim 19.

* * * * *